ROBLEY D. EVANS
INVENTOR.
BY Rines and Rines
ATTORNEYS

FIG. 4
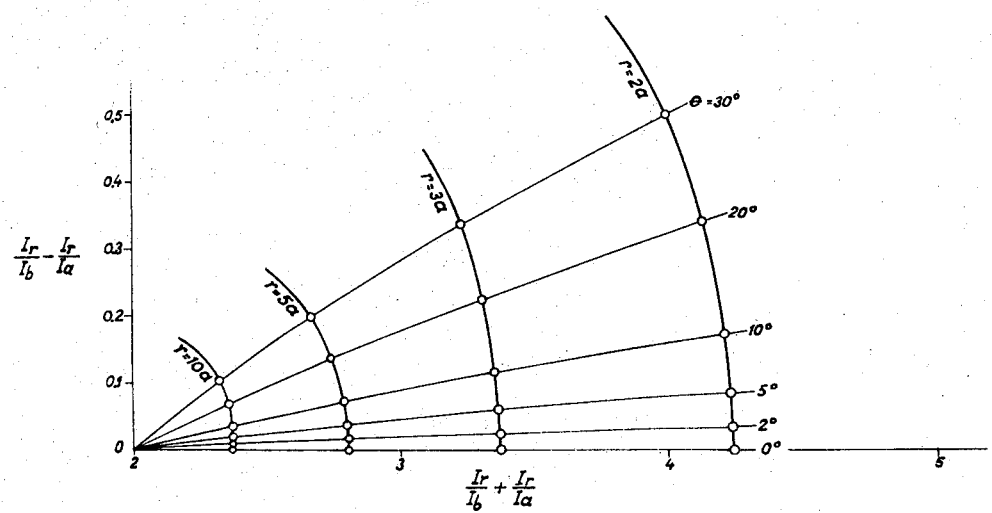
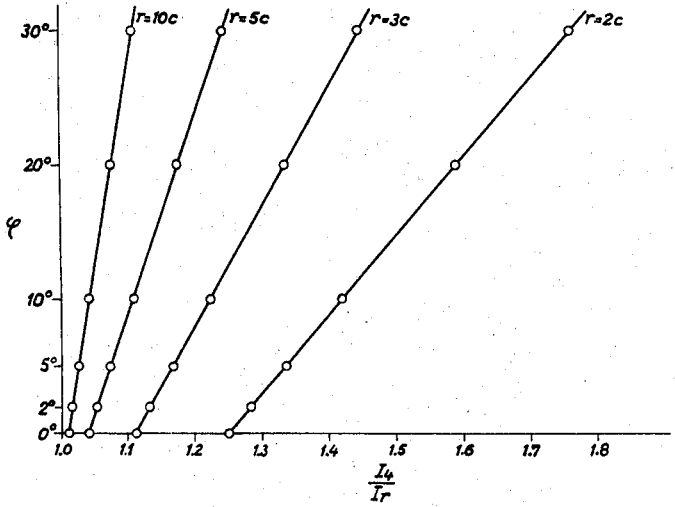
FIG. 5
ROBLEY D. EVANS
INVENTOR.
BY Rines and Rines
ATTORNEYS United States Patent Office 3,430,243
Patented Feb. 25, 1969

3,430,243
METHOD OF AND APPARATUS FOR DETERMINING THE DISTANCE AND/OR ANGLES BETWEEN OBJECTS WITH THE AID OF RADIANT ENERGY
Robley D. Evans, 15 Hickory Lane, Belmont, Mass. 02178
Filed Apr. 4, 1966, Ser. No. 539,690
U.S. Cl. 343—112
Int. Cl. G01s 3/02
28 Claims

ABSTRACT OF THE DISCLOSURE

This disclosure deals with novel multiple-detector arrays that enable range, bearing and elevation determination through ratio comparisons of signals received at the multiple detectors.

---

Figure 1:
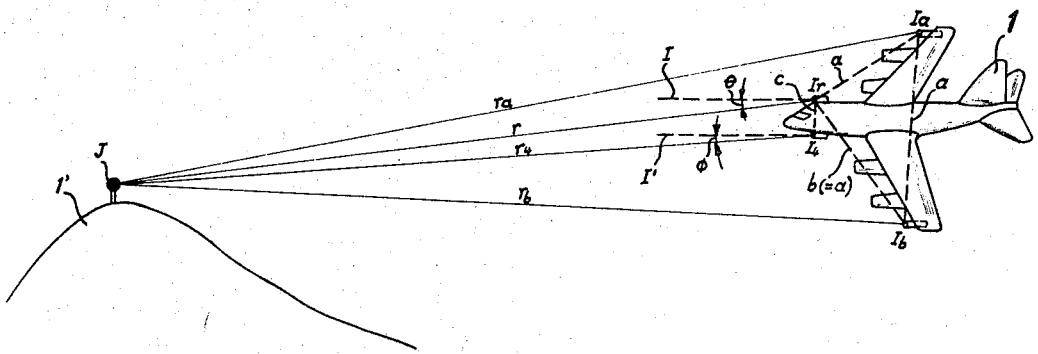

The present invention relates to methods of and apparatus for determining, with the aid of radiant energy, the distance or range between objects and/or the relative bearing and elevation angles therebetween, being more particularly related to the determination of distance between objects that are receding from one another or are approaching one another to within very close ranges.

Though numerous types of radiant energy ranging devices have long been proposed and utilized, including conventional types or radar, sonor, proximity devices, altimeters and related equipment, to mention but a few, these are all generally subject to the principal disadvantage that, if the distance or range between objects becomes very small, not only does the sensitivity and accuracy of the apparatus become markedly reduced, but there are serious limitations in the measurement of very small ranges resulting from such factors, among others, as "spurious clutter" in the case of radar and sonor systems, finite wave length of the radiant energy in the case of other systems, and other limiting factors.

An object of the present invention, accordingly, is to provide a new and improved method of and apparatus for continually determining the distance or range between objects that shall not be subject to the above-described limitations; but that, to the contrary, actually increases in accuracy if the distance between the objects becomes smaller.

In prior ranging systems, including those of the above-described type, moreover, the signal indications are dependent upon the strength of received signal and are subject to serious deleterious effects when other objects or background radiation, including spurious radiation present in the ranging medium, occur; such systems also being dependent for sensitivity upon the signal strength and appropriate operational condition of the source or transmitter of radiant energy.

Another object of the present invention, on the other hand, is to provide a novel method of and apparatus for distance determination that is not dependent for its sensitivity upon either the efficiency of the transmitting source (or, for that matter, upon its signal strength) or the presence of intervening objects or background radiation, within wide limits of operation.

Still a further object is to provide new and improved radiant energy distance determining apparatus of more general utility, as well.

An additional object is to provide a novel radiant energy angle determining apparatus.

A further object still is to provide a new and improved apparatus of the character described that enables determination of the rate of closure of any or all of the distance, relative bearing angle, and relative elevation angle between objects.

An additional object is to provide a new and improved method of the energy detection of objects that is generically applicable to all practical types of radiant energy.

Other and further objects will be explained hereinafter and are more particularly pointed out in the appended claims. In summary, however, from one of its aspects, the invention involves the propagating of radiant energy between objects, one of which is provided with at least two energy detectors spaced from each other a predetermined distance $a$ having at least a component in the direction between the objects, with the apparatus having means for measuring the ratio of the intensities of the energy received and detected by the respective detectors and means for indicating said ratio in terms of the distance between the objects. Preferred details and modifications are hereinafter more fully set forth.

Figure 3:
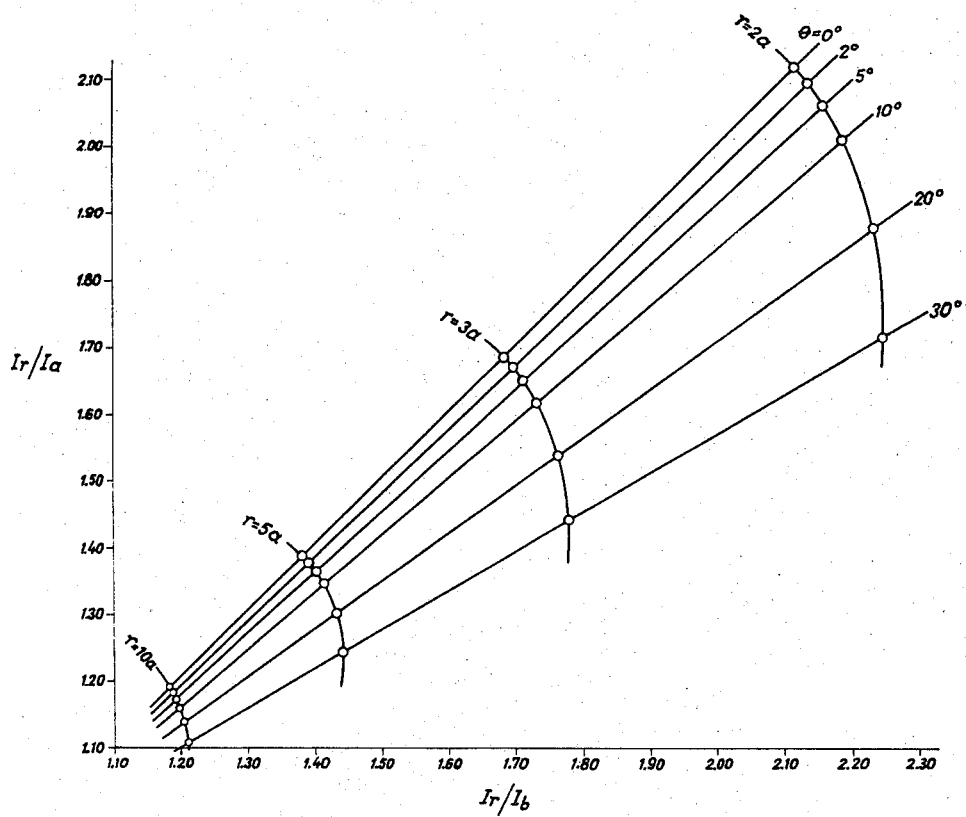
Figure 2:
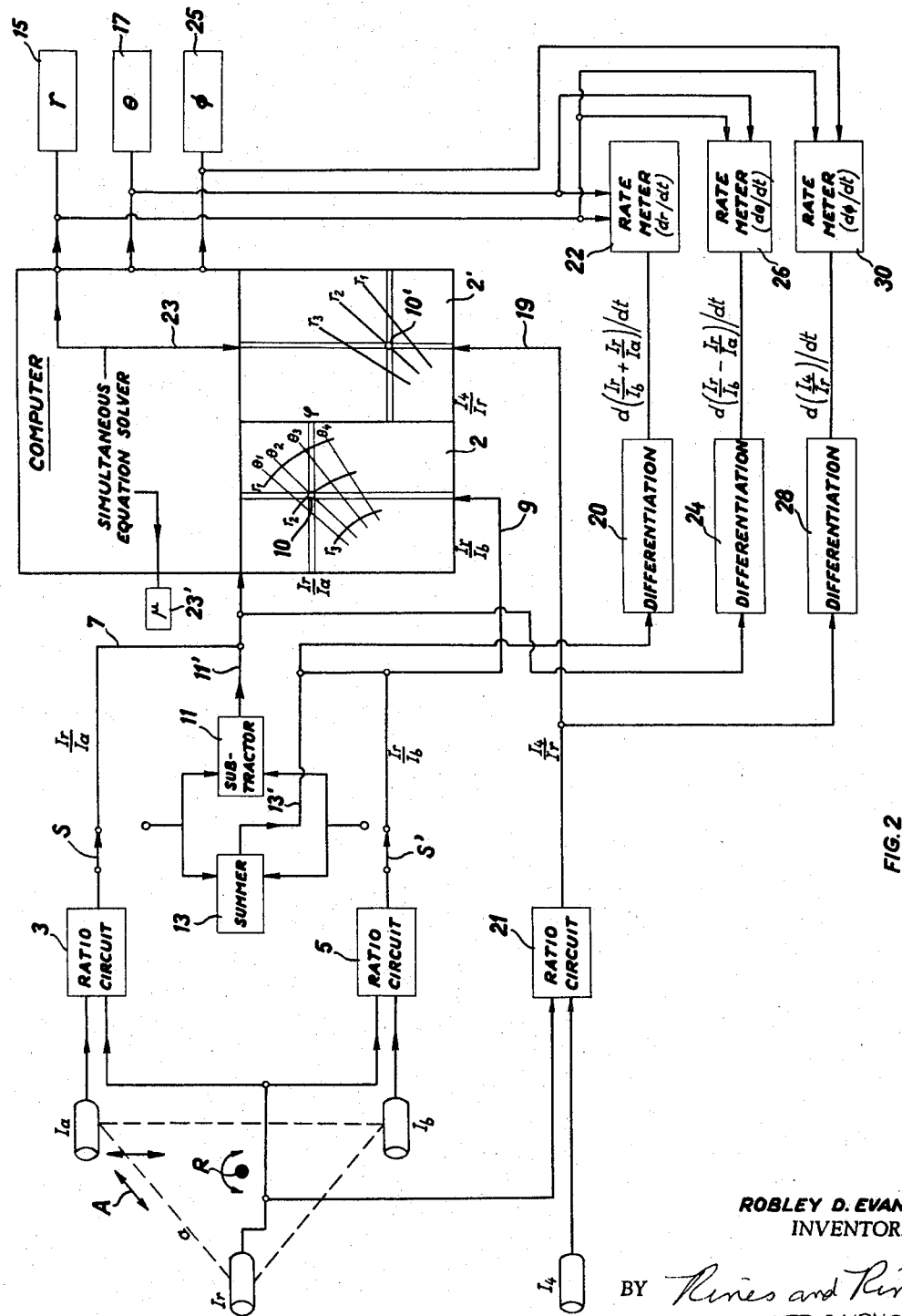

The invention will now be described with reference to the accompanying drawings, FIG. 1 of which is an isometric schematic view illustrating the invention as applied to aircraft obstacle detection;

FIG. 2 is a schematic block diagram of a preferred apparatus for use in the system of FIG. 1; and FIGS. 3, 4 and 5 are graphs, the data of which may either be presented visually for observation or employed in conventional computing apparatus for interpreting the results of the measurements attained in the systems of FIGS. 1 and 2.

Referring to FIG. 1, the invention, as previously mentioned, is shown applied to the important application of the avoidance of obstacles such as mountain peaks, by aircraft; though it will be evident from the following description that the underlying method and basic apparatus of the invention are equally useful in the approach of aircraft to landing strips, the approach of moving aircraft or other space vehicles to other vehicles or surfaces, the approach of underwater and other craft to obstacles, surfaces, and other craft and, indeed, to a wide variety of systems wherein the distance between objects and their relative angles and rates of closure are to be measured and monitored, particularly in operations where the distance between the objects becomes very small and, in limiting case, may result in the contact between the objects. The term "object" as herein employed, thus, refers not only to the vehicles and similar devices but to surfaces that are approached by the same. For illustrative purposes, FIG. 1 shows an aircraft object 1 approaching a mountain peak object 1', wherein it is desired continually to determine the distance or range between the objects 1 and 1' and/or the relative bearing and elevation angles therebetween. The mountain peak object 1' is shown provided with a source or transmitter J of radiant energy that may, for example, be a beacon or source of incoherent electromagnetic radiation (such as radar waves, microwaves, X-rays, gamma rays, infrared waves, or other light waves, both visible and invisible), corpuscular radiations, radioactive radiations, and acoustic waves, both in the audible and sub- and super-audible ranges.

As will later be pointed out, coherent light energy, as from a laser source J, may also be employed, as may coherent acoustic and other waves, as well. Depending upon the nature of the radiant energy source J, appropriate energy receiving systems or detectors will be provided upon the aircraft object 1.

In FIG. 1, four such energy detectors are illustrated, a principal detector being located near the nose at $I_r$, a pair of detectors near the extremities of the aircraft wings at $I_a$ and $I_b$, and a further detector $I_4$ disposed below the detector $I_r$ on the underside of the aircraft object 1. The distance or range from the detector $I_r$ to the source J on the mountain top object 1' is designated by the symbol $r$; and the corresponding distances from the other detectors $I_a$, $I_b$, and $I_4$ are respectively designated by the symbols $r_a$, $r_b$, and $r_4$. The detectors $I_r$, $I_a$, and $I_b$ determine a plane indicated as a dotted triangle, with the spacing between the detectors $I_a$ and $I_r$ being represented by the distance $a$, and the spacing between the detectors $I_r$ and $I_b$ being represented by the distance $b$. Though arrangements may be employed with different detector spacings, as later more fully explained, in the preferred example of FIG. 1, the spacing $b$ is made substantially equal to the spacing $a$ and substantially equal to the spacing between the detectors $I_a$ and $I_b$; whereby the detectors $I_r$, $I_a$, and $I_b$ form the vertices of a substantially equilateral triangle, the perpendicular bisector of which may be represented by the upper edge portion of the aircraft, an extension of which is indicated by the dotted line I. The azimuthal or relative bearing angle between the heading of the aircraft object 1 and the source J at the mountain top object 1' is represented by the angle $\theta$ lying substantially in the plane formed by the three detectors $I_r$, $I_a$, and $I_b$. When the aircraft is turned in bearing or heading so as to point directly at the source J, the angle $\theta$ is 0. The angle of elevation of the aircraft object 1 is shown indicated with reference to the dotted line I' through the detector $I_4$ by the symbol $\phi$.

Considering, first, the pair of detectors $I_r$ and $I_a$, I have found that when the detectors are oriented so that the direction, $a$, of their spacing has at least a component in the direction $r$ between the objects 1 and 1' (and preferably substantially parallel to the direction $r$ in those applications where only two detectors are used), that the ratio of the intensities of the energy received from the source J at the detectors $I_r$ and $I_a$ is a measure of the distance $r$; and continual monitoring of that ratio enables a continual determination of the distance $r$ that becomes more sensitive and more accurate as $r$ becomes smaller and smaller and more comparable with the separation distance, $a$, between the detectors $I_r$ and $I_a$.

In general, the energy transmitted from the source J to the object 1 will decrease with distance from the source J in accordance with a predetermined function generally represented as $f(r, \mu)$, where $\mu$ is an attenuation parameter determined by the type of energy and the nature of the medium in the region $a$ between the detectors $I_r$ and $I_a$. Thus a measurement of the ratio $$\frac{I_r}{I_a} = \frac{f(r, \mu)}{f(r_a, \mu)}$$

as above mentioned, enables an indication of the distance $r$ as will be more fully hereinafter discussed.

In the case of electromagnetic radiation, the function is generally of the form $e^{-\mu r}/r^n$, where $n$ is generally two (that is, the inverse square law) or some other integer or fraction. The ratio of the intensity of the energy received at detector $I_r$ to that detected at $I_a$ may then be shown to be given substantially by the expression:

$$I_r/I_a = (I+a/r)^n e^{\mu a}$$

which, it will be noted, is independent of the signal strength of the source J and depends solely on the known separation $a$ between detectors $I_r$ and $I_a$ and the attenuation parameter $\mu$ in the region between the detectors. With these values given, the ratio $I_r/I_a$ thus gives a measure of the range or distance $r$ between the objects 1 and 1'.

In view of the independence of source signal strength in this ratio $I_r/I_a$, it will be clear that the ranging system, provided a signal can be received, will operate with equal efficacy irrespective of weakness, time fluctuations, or other operational defects in the transmitting source J and irrespective of whether some other objects have entered the region between the objects 1 and 1'. This independence is a feature not possible with present day types of ranging systems as before explained and would, for example, enable a flight of helicopters continually to monitor the lead helicopter despite the fact that other craft should wander in the path between them and the lead helicopter. Other highly advantageous results following from this phenomenon will also be readily apparent in other applications of the invention.

It should be noted, moreover, that while the embodiment of FIG. 1 has been described in connection with the propagation of energy from the transmitting source J at the object 1', the invention is equally useful if the object 1 carries a source or transmitter that reflects energy from the object 1' and reradiates the reflected energy to the detectors $I_r$ and $I_a$, or if some other source reflects energy from the object 1' to the detectors disposed upon the aircraft object 1. It should also be observed that the type of modulation or continuous wave operation employed is not significant since the detectors, in accordance with the present invention, measure the intensity of the energy received thereat and determine the ratio of those detected intensities.

In the most common cases, the energy source J will emit in a broad angular pattern and often more or less uniformly in all directions. In those exceptional cases such, as for a laser beam whose angular breadth may be less than that subtended by an array of detectors on the aircraft or other object, a rotating beam or beacon can be employed. The energy source J can also be modulated to provide an identification signal which could be read out by a simple auxiliary circuit, without altering the instantaneous measured ratios.

By orienting the heading of the aircraft object 1 with respect to the object 1', or by otherwise moving the detectors $I_r$ and $I_a$ as a unit to present different angles $\theta$ to the object 1', the maximum ratio $I_r/I_a$ can be monitored, alining the detectors $I_r$ and $I_a$ with the object 1' and indicating the azimuthal bearing thereof.

Similarly, the elevation angle to the object 1' may be determined with the aid of the detector $I_4$, shown positioned a distance $c$ below the detector $I_r$. By changing the angle of attack of the aircraft object 1 such that the ratio of the intensities received at detectors $I_r$ and $I_4$ is substantially unity, the object 1 will be directed elevationally toward the object 1'. A minimum ratio of intensities between the pair of detectors $I_a$ and $I_b$ would also enable azimuthal orientation of object 1 with respect to the object 1'.

Though only a single pair of detectors $I_a$ and $I_r$ could thus be used continually to measure range and bearing, it is preferred to employ the third detector $I_b$ in the substantially equilateral triangle arrangement of FIG. 1 and to measure both the intensity ratio of the energy received at the pair of detectors $I_r$ and $I_a$ and the ratio of intensities received at the pair of detectors $I_r$ and $I_b$. In the generalized case where the spaces $a$ and $b$ may not be the same, these ratios are given by the following expressions:

$$I_r/I_a = (I+a'/r)^n e^{\mu a'}$$

and $$I_r/I_b = (I+b'/r)^n e^{\mu b'}$$

in which $a'$ and $b'$ are substantially the components or projections of $a$ and $b$ in the direction of $r$.

In the important case of $n$ being equal substantially to 2 and the distances $a$, $b$, and that between $I_a$ and $I_b$ being substantially equal, these reduce to the form:

$$\frac{I_r}{I_a} = \left[ I + \left(\frac{a}{r}\right)^2 - \frac{2a}{r} \cos(150° - \theta) \right] e^{\mu(r_a - r)}$$

$$\frac{I_r}{I_b} = \left[ I + \left(\frac{a}{r}\right)^2 - \frac{2a}{r} \cos(150° + \theta) \right] e^{\mu(r_b - r)}$$

In this important case, where $\mu(r_a - r)$ and $\mu(r_b - r)$ are small compared with unity, as in the case of radio wave or other incoherent electromagnetic radiation in air, the simultaneous solution of the above expressions provides a direct indication of the distance $r$ and the angle $\theta$.

It now remains to explain what type of circuit or circuits may be employed to effect the ratio measurements and parameter indications above discussed. Referring to FIG. 2, the detectors $I_a$ and $I_b$ are shown feeding their outputs, representative of the intensity of the energy received thereby to respective ratio circuits 3 and 5 to which the output of the detector $I_r$ is also fed. These ratio circuits may, for example, be of the type described by Robley D. Evans, et al., in Review of Scientific Instruments 10, 339–344 (1939), or of any other well-known type for obtaining an output representative of the received energy intensity ratios $I_r/I_a$ and $I_r/I_b$, respectively. The output signals representing these ratios are shown respectively applied by conductors 7 and 9 to the ordinate coordinate input and the abscissa coordinate input of, for example, a computing X–Y plotter 2 of any conventional type such as those currently marketed by the Hewlett-Packard Corp., Moseley Division, California, or by the Houston Instrument Corp. of Bellaire, Tex.

There will thus be continually entered the ratio $I_r/I_a$ as an ordinate quantity and the ratio $I_r/I_b$ as an abscissa entry providing at the conventional coordinate point indicator of such apparatus, designated by the reference numeral 10, a point which is visually and/or electrically representative of the distance $r$ and angle $\theta$. For the visual presentation, it will be noted that a plurality of successive arcuate contour lines $r_1$, $r_2$ and $r_3$ are shown on the plotter 2 intersecting successively different bearing angle lines $\theta_1$, $\theta_2$, $\theta_3$, $\theta_4$, etc. The indicator 10 is shown in coincidence with the distance line $r_2$ and the angle $\theta_2$ indicating the distance between the objects as value $r_2$ and the azimuth or bearing angle as $\theta_2$.

In FIG. 3, an actual set of data for the plotting computer 2 is presented for the case of the equilateral triangle structure of FIG. 1 showing range contours at $r=10a$, $r=5a$, $r=3a$ and $r=2a$ intersecting bearing angle lines for $\theta=0°$, 2°, 5°, 10°, 20° and 30°.

It will be observed that for smaller distances (the smallest of which is shown by the contour line $r=2a$ in FIG. 3), the apparatus of the present invention becomes increasingly sensitive and accurate, as indicated by the wider spacing of the angle lines and the greater fanning of the arcuate range contour lines. For a distance $a$ of 100 feet, for example, which is entirely feasible with a jet 707 or similar aircraft, the ratio $I_r/I_a$ is shown in the following Table I to change more significantly for the smaller values of the distance $r$ for each of two exemplary values of the angle $\theta$; namely, $\theta=0°$ (on heading) and $\theta=10°$. The change in this intensity ratio for the 100 feet between a distance or range of 200 feet and 100 feet is much greater than the change in ratio for the 100 feet between a distance of 300 feet and 200 feet.

Specifically, the difference between a range of 300 feet and 200 feet between the object produces a difference in intensity ratio of 0.428 for the $\theta=0°$ example; whereas the intensity ratio changes by 1.616 in the next 100 feet between 200 feet and 100 feet, thus demonstrating the increased sensitivity and accuracy of the present invention as smaller distances are approached and as distinguished from prior art types of ranging systems.

TABLE I

| $a=100$ feet, $r$ (ft.) | $I_r/I_a$ | |
|---|---|---|
| | $\theta=0°$ | $\theta=10°$ |
| 100 | 3.732 | 3.532 |
| 200 | 2.116 | 2.016 |
| 300 | 1.688 | 1.622 |
| 500 | 1.386 | 1.346 |
| 1,000 | 1.183 | 1.163 |

It has further been found that by applying to the ordinate input of the X–Y plotter 2 the difference between the ratios $I_r/I_b$ and $I_r/I_a$, as obtained in a subtractor 11, when the ratio circuits 3 and 5 are connected by moving switches S and S' respectively downward and upward in FIG. 2 (the output of the subtractor 11 being shown applied to the ordinate input of the plotter 2 at 11', and applying to the abscissa input at 9 the output 13' of a summer 13 that gives the sum of the said ratios), a further most convenient and advantageous measure of range and bearing angle can be obtained in the plotter 2.

Circuit elements such as the subtractor 11, the summer 13, as well as time-derivative circuits 20, and others mentioned hereinafter are state-of-the-art stock components available from such commercial suppliers as George A. Philbrick Researches, Inc. Boston, Mass., Burr-Brown Research Corp., Tucson, Ari., Analog Devices, Inc. Cambridge, Mass., Nexus Research Laboratories, Canton, Mass., Bourns, Inc. and others.

As is more particularly illustrated in FIG. 4 where the difference and sum of the pairs of ratios are plotted, there are shown, again, contours of range or distance ranging from $r=2a$ to $r=10a$ and intersecting successively increasing angle lines ranging from $\theta=0°$ up to $\theta=30°$. With the systems of FIGS. 1 and 2 and this sum and difference ratio determination, it has been found that the difference of the ratios is given by the following expression:

$$I_r/I_b - I_r/I_a = 2(a/r)\sin\theta$$

The sum of the pair of ratios may be shown to be given by the following equation:

$$I_r/I_b + I_r/I_a = 2[1 + (a/r)^2 + 2a/r(0.866\cos\theta)]$$

Examination of the above equations shows that the sum of the ratios is substantially independent of the angle $\theta$ over a substantial range, which accounts for the substantial range, which accounts for the substantially vertical line character of the range contours of FIG. 4. From the above equation for the sum of the ratios, it will be evident that for small angles $\theta$, the bracketed expression depends substantially entirely on the range $r$ and is nearly independent of the angle.

This independence is clearly illustrated in the following Table II, wherein the values of the sum of the ratios is substantially the same irrespective of the angle $\theta$.

TABLE II

| $a=100$ feet, $r$ (ft.) | $\frac{I_r}{I_b} + \frac{I_r}{I_a}$ | | |
|---|---|---|---|
| | $\theta=0°$ | $\theta=10°$ | $\theta=20°$ |
| 100 | 7.464 | 7.410 | 7.256 |
| 200 | 4.232 | 4.206 | 4.128 |
| 300 | 3.377 | 3.359 | 3.307 |
| 500 | 2.773 | 2.762 | 2.731 |
| 1,000 | 2.366 | 2.361 | 2.346 |

The expression for the difference of the ratios above presented, however, shows the rather remarkable characteristic of a variation that is inversely proportional to the range $r$ and that is actually proportional to the sine of the angle $\theta$ and thus, for small angles, substantially proportional to the angle itself. This proportionality is, of course, a highly advantageous effect and produces marked changes in the ratio difference proportionately with angle as indicated in the following Table III:

TABLE III

| $a=100$ feet, $r$ (ft.) | $\frac{I_r}{I_b} - \frac{I_r}{I_a}$ | | |
|---|---|---|---|
| | $\theta=0°$ | $\theta=10°$ | $\theta=20°$ |
| 100 | 0.000 | 0.347 | 0.684 |
| 200 | 0.000 | 0.174 | 0.342 |
| 300 | 0.000 | 0.116 | 0.228 |
| 500 | 0.000 | 0.069 | 0.137 |
| 1,000 | 0.000 | 0.035 | 0.068 |

Thus, either with the aid of the predetermined data of FIG. 3 or that of FIG. 4 (with the switches S and S' in the corresponding positions), coincidence of the appropriate ratio inputs as coordinates with the predetermined range and angle data enables a continual indication of the distance $r$ and angle $\theta$ as the object 1 approaches the object 1', and with increasing sensitivity as the distance $r$ becomes smaller and more comparable with the separation of the detectors.

Not only may visual indication and measurement of the distance and angle $\theta$ be thus presented, but the coordinate input information may be used for simultaneous equation solving in a conventional computer circuit for handling the above equations to provide output signals that enable respective continual indications of the distance $r$ as at the range meter 15 and the bearing angle $\theta$ as at the angle meter 17.

In the system of FIG. 2, visual indication of the elevation angle $\phi$ is provided in a similar computer X–Y plotter 2' into the abscissa input of which the ratio $I_4/I_r$ is applied, as at 19, from a ratio circuit 21, similar to the ratio circuits 3 and 5 before discussed, into which is fed the output of the respective detectors $I_r$ and $I_4$. The data effectively stored in the plotter 2' by the graphical chart there shown enables a determination of the value of the elevation angle $\phi$ since the distance $r$ is known and may be applied at 23. The range curves or lines $r_1, r_2, r_3$ are shown on the plotter 2' as more particularly presented in FIG. 5 for values of $r=10c$ down to $r=2c$. Since the indicator 10' will coincide with the measured value of the range and the input of the ratio $I_4/I_r$ enables a conicidence thereof with the appropriate range line, the resulting angle $\phi$ will be indicated along the ordinate.

Again, the output angle $\phi$ may be electrically read out, as is well known, as in the meter 25.

In those cases where the attenuation parameter $\mu$ may not be known, as in the presence of an unsuspected attenuating medium between the detectors, the value of $\mu$, as before stated, may be obtained at 23' through the simultaneous equation solution previously discussed. As one explicit example, this may be effected for the case where the triangular orientation of the three detectors $I_r$, $I_a$ and $I_b$ is collapsed to a very flat triangle (that is to substantially a colinear array of three detectors) by computing $\mu$ from the following intensity ratios:

$$\mu = 2 \frac{\frac{1}{b}\left[\sqrt{\frac{I_r}{I_b}}-1\right]-\frac{1}{a}\left[\sqrt{\frac{I_r}{I_a}}-1\right]}{\sqrt{\frac{I_r}{I_b}}-\sqrt{\frac{I_r}{I_a}}}$$

Usually there would be little operational interest in the numerical value of $\mu$, and one extra detector in any of the systems described would provide the signals required to correct for the effect of attenuation in the general equations hereinbefore presented.

Thus, the use of three detectors $I_r$, $I_a$, and $I_b$, from which two independent ratios are derived enables not only a determination of the effective value of the attenuation parameter loss, but alternatively may provide a redundancy mechanism for checking the operational integrity of either of the two pairs of detectors. In addition, the use of the third detector and the measurement of simultaneous ratios (including sums and differences of ratios) in the context of the data presented in FIGS. 3, 4 and 5 enables the indication of relative bearing and/or relative elevation angles between the objects 1 and 1'. More than this, a third detector will enable a measurement that can provide a background energy correction for the distance determination, such background energy being analogous to noise or spurious energy present in the path between the objects 1 and 1'. If, for example, the ratio $I_r/I_a$ is to be employed as first described to measure the distance $r$, a measurement by the ratio $I_r/I_b$ can provide information as to any correction that should be applied to the first named measurement as a result of the presence of such background radiation or of said attenuation parameter.

For example, if an unwanted background or regional noise interference of strength B is present at all detectors, then the signal from detector $I_r$ will be raised from $I_r$ to $(I_r+B)$, and similarly for each of the other detectors in the system. Then one extra detector will serve to evaluate the one newly added parameter B. Thus, in the substantially colinear array of three detectors just discussed, the output signals from the three detectors would be increased from $I_r$, $I_a$, and $I_b$ to $(I_r+B)$, $(I_a+B)$, and $(I_b+B)$. For any one detector the observed ratio of signal outputs would be changed by this background from, for example, the value $I_r/I_a$ to the value $$\frac{I_r+B}{I_a+B}=\frac{I_r}{I_a}\left[1-\left(\frac{B}{I_a}-\frac{B}{I_r}\right)+\begin{array}{c}\text{quadratic and}\\\text{higher terms}\end{array}\right]$$

In many applications, the correction terms will be negligible. Especially in applications which involve the difference of two such ratios there will be an almost complete cancellation of even a relatively large background. Whenever desired, the background can be completely eliminated by means of one extra detector. Thus, when one extra detector is added as above to the two-detector ranging system, we can subtract the outputs from pairs of detectors and then form the ratios of these differences. Algebraically, this corresponds to $$\frac{(I_r+B)-(I_a+B)}{(I_r+B)-(I_b+B)}=\frac{I_r-I_a}{I_r-I_b}$$

and this ratio is completely independent of background. For the example of three substantially colinear detectors at separations $a$ and $b$, as discussed hereinbefore, this ratio of the differences has the exact value $$\frac{I_r-I_a}{I_r-I_b}=\frac{1-[r/(r+a)]^2 e^{-\mu a}}{1-[r/(r+b)]^2 e^{-\mu b}}$$

which again determines the range $r$ in terms of known parameters, and with full and complete elimination of all background or noise effects. Reference in the specification and claims, accordingly, to the measurement or indicating of the ratios of or between intensities thus generically embraces, also, ratios which include sums or differences of the intensities, as well.

The explicit discussion just given of background or noise elimination through the addition of one detector to the system is a specific illustration of a broad general principle; namely, that the number of independent detectors used (either by actual installation or by moving one or more actual detectors to new locations in the system) must always equal or exceed the number of unknown parameters. Thus if only the two parameters source strength J, and range $r$, are unknown, two detectors serve to eliminate J (or measure J if that were meaningful) and to measure the range $r$.

Similarly, three detectors can measure (or eliminate) three parameters such as source strength J, range $r$, and azimuth $\theta$.

If background is a problem in any specific embodiment of the method, then one more detector location provides the input information to eliminate or, if desired, to measure the background. Similarly if the degree of attenuation between detectors is significant, one more detector location will eliminate or evaluate this parameter.

Thus, in general, when the number of detector locations just equals the number of unknown parameters, the solution for each parameter is accessible. This is equivalent to recalling that $n$ independent and simultaneous equations suffice to give unique solutions for $n$ variables. If now the number of detector locations is increased by one over and above the number of unknown parameters, we have an overdetermined system, exactly like $n+1$ equations in only $n$ unknowns. Such an overdetermined system can yield unique solutions for the $n$ unknown parameters only if all the equations are mutually consistent and correct. The one (or more) extra detector locations provides redundant information just as does the $(n+1)$th equation. This feature of partial redundancy, through the provision of at least one more detector location than the minimum number required, provides an overall check on the operational integrity of the entire system.

Lastly, the invention also enables a facile determination of the rate of closure of each of the range or distance $r$, the bearing angle $\theta$ and the elevation angle $\phi$. As an illustration, the rate of closure of the range $r$ is shown effected by feeding the output 13 of the summer 13 to a time differentiation circuit 20 to obtain a signal representing the differentiation $$d\left[\frac{I_r}{I_b}+\frac{I_r}{I_a}\right]/dt$$

It will be recalled as above explained that the said sum of the ratios is almost entirely dependent upon the range $r$ so that this differential output is a measure of the rate of change or closure of the range or distance $r$. This may of course be indicated in any desired closure rate meter at 22.

Similarly, since the difference of the ratios in the system of FIGS. 1 and 2, as before explained, varies proportionately with the bearing angle, the output 11' of the subtractor 11 may be differentiated as at 24 to indicate the rate of change of bearing angle in a similar angular rate meter 26. The rate of variation of elevation angle may also be obtained by differentiating the output of the ratio circuit 21 and indicating the same on a similar rate meter 30.

Though the aircraft 1 provides a means, if desired, for moving the detectors as a unit in azimuth and elevation, in other systems it may be desired to mount the detectors for rotational movement as schematically illustrated at R in FIG. 2. Similarly, rocking in an elevational plane may be effected. It may also be desired to effect movement of the detectors toward one another as schematically illustrated by the arrows A in FIG. 2. If, for example, the detectors are mounted on a track, this movement toward and away from each other may readily be effected in a well-known manner as by a motor driven rack and pinion, or other equivalent mechanism, not shown. One useful purpose in changing the distance, $a$, between detectors $I_r$ and $I_a$, for example, would be to provide an internal check on the reading of range $r$ obtained from two detectors at separation $a$. If the same range is not obtained when a different separation is used, then (in the absence of equipment failure) the difference can be used to correct for the effect (if present) of background or noise in the system or of a significantly large attenuation coefficient in the medium between the detectors.

Movement of one or more detectors in the system to different detector sites, points or positions, is an operational equivalent of placing additional detectors at such sites, points or positions in the system. The word "detector" as used herein is thus to be interpreted as a detector location, site or point occupied by an actual detector at the time when readings which involve this site are taken, although an actual detector may be moved out of this site when readings at this site are not being taken.

Further modifications will also occur to those skilled in the art, and all such are considered to fall within the spirit and scope of the invention as defined in the appended claims.

What is claimed is:

1. Apparatus for continually determining the distance $r$ between first and second objects having, in combination, means for propagating energy between the objects, one of the objects being provided with at least two energy detectors spaced from each other a predetermined distance $a$ and having at least a component in the direction between the objects, the energy decreasing with distance in accordance with a predetermined function generally represented at $f(r, \mu)$, where $\mu$ is an attenuation parameter determined by the type of energy and the medium between the detectors, means for measuring the ratio of the intensities of the energy $I_r$ and $I_a$ detected by the respective detectors, over the corresponding distance paths $r$ and $r_a$ between the respective detectors and the other object, means for indicating said ratio in terms of the distance $r$, as given by the expression:

$$\frac{I_r}{I_a}=\frac{f(r,\mu)}{f(r_a,\mu)}$$

and means being provided for varying the distance $a$ and indicating the change in the ratio $I_r/I_a$ caused by such variation.

2. Apparatus for determining at least one of relative bearing and elevation angles between first and second objects, having, in combination, means for propagating energy between the objects, the first of the objects being provided with at least two energy detector sites spaced from each other a predetermined distance, means for moving the said detector sites as a unit to present different angles to the second object, means for measuring the ratio of the intensities of the energy detected at the respective detectors, means for indicating at least one of substantially maximum ratio, minimum ratio, and unity ratio to indicate the said angles, and means being provided for varying the said predetermined distance and indicating the change in said ratio caused by such variation.

3. Apparatus for continually determining the distance $r$ between first and second objects having, in combination, means for propagating energy between the objects, the first object being provided with at least three energy detectors spaced predetermined distances from each other at least one spacing having at least a component in the dirction between the objects, the energy decreasing with distance in accordance with a predetermined function generally represented as $f(r, \mu)$, where $\mu$ is an attenuation parameter determined by the type of energy and the medium between the detectors, means for measuring the ratios of the intensities of the energy detected by at least two pairs of the detectors, and means for determining the distance $r$ from said ratios.

4. Apparatus as claimed in claim 3 and in which means is provided for compensating for the effective value of the attenuation parameter $\mu$.

5. Apparatus as claimed in claim 3 and in which one of the said detectors comprises redundancy means for enabling checking the operating integrity of the remaining detectors.

6. Apparatus as claimed in claim 3 and in which means is provided for comparing the said ratios to indicate also at least one of the relative bearing and elevation angles between the first and second objects.

7. Apparatus as claimed in claim 3 and in which means is provided for enabling background energy correction of the distance-determining means as the energy is received in the presence of said background energy.

8. Apparatus as claimed in claim 3 and in which the said detectors are disposed in the form of substantially a triangle.

9. Apparatus as claimed in claim 3 and in which the said energy is of the type having said predetermined function $f(r,\mu)$ substantially given by $e^{-\mu r}/r^n$, the said determining means being adjusted to indicate the distance $r$ as given substantially by the expressions:

$$I_r/I_a=(I+a/r)^n e^{\mu a}$$

and $$I_r/I_b=(I+b/r)^n e^{\mu b}$$

where $n$ is any integral number of fraction, $a$ is the distance between two of the detectors, $b$ is the distance between one of the said two detectors and the third detector, and $I_r$, $I_a$, $I_b$ are respectively the intensities of the energy detected by the said one detector and the respective other two detectors.

10. Apparatus as claimed in claim 9 and in which $n=2$ and the detectors are disposed in substantially an equilateral triangle wherein $a=b$, with the said one detector at the distance $r$ to be measured from the second object and the other two detectors at respective distances $r_a$ and $r_b$ from the second object, the ratio measuring means indicating the ratios given by substantially the following expressions:

$$\frac{I_r}{I_a} = \left[ 1 + \left(\frac{a}{r}\right)^2 - \frac{2a}{r} \cos(150° - \theta) \right] e^{\mu(r_a - r)}$$

$$\frac{I_r}{I_b} = \left[ 1 + \left(\frac{a}{r}\right)^2 - \frac{2a}{r} \cos(150° + \theta) \right] e^{\mu(r_b - r)}$$

where $\theta$ is the angle of the direction $r$ with respect to the perpendicular bisector of the said equilateral triangle.

11. Apparatus as claimed in claim 10 in which $\mu(r_a - r)$ and $\mu(r_b - r)$ are small compared with unity and means is provided for the simultaneous solution of the said expressions for $I_r/I_a$ and $I_r/I_b$, thereby directly to indicate the distance $r$ and angle $\theta$.

12. Apparatus as claimed in claim 3 and in which a fourth detector is provided at the first object outside the plane determined by the three first-named detectors, and means is provided for measuring the ratio between the intensities of the energy detected by the fourth detector and one of the said three detectors to provide a measure of the angle of the said plane with respect to the second object.

13. A method for determining distance between first and second objects, that comprises, propagating energy between the objects, detecting the energy received at two spaced points at the first object, orienting said points along a direction having at least a component in the direction between the objects, indicating the ratio of the intensities of the energy detected at said points as so oriented to indicate said distance, detecting the energy at still a third point at the first object spaced from the said two points, indicating the ratio of the intensities of the energy detected at said third point and at least one of the said two points, and measuring from said ratios a relative angle between the first and second objects.

14. A method as claimed in claim 13 and in which the additional steps are performed of detecting the energy at a fourth point at the first object spaced out of the plane determined by the said two points and the third point, indicating the ratio of the intensities of the energy detected at said fourth point and at least one of the other points, and measuring from said ratios a further angle of said plane with respect to said second object.

15. A method as claimed in claim 13 and in which the additional step is performed of measuring from the said ratios the rate of change thereof, thereby to indicate the rate of closure of said relative angle.

16. A method for determining distance between first and second objects, that comprises, propagating energy between the objects, detecting the energy received at two spaced points at the first object, orienting said points along a direction having at least a component in the direction between the objects, indicating the ratio of the intensities of the energy detected at said points as so oriented to indicate said distance, measuring the rate of change of the said ratio, thereby to indicate the rate of closure of the said distance between the first and second objects.

17. Apparatus for continually determining the distance $r$ between first and second objects having, in combination, means for propagating energy between the objects, one of the objects being provided with at least two energy detectors spaced from each other a predetermined distance $a$ and having at least a component in the direction between the objects, the energy decreasing with distance in accordance with a predetermined function generally represented as $f(r, \mu)$, where $\mu$ is an attenuation parameter determined by the type of energy and the medium between the detectors, means for measuring the ratio of the intensities of the energy $I_r$ and $I_a$ detected by the respective detectors, over the corresponding distance paths $r$ and $r_a$ between the respective detectors and the other object, means for indicating said ratio in terms of the distance $r$, as given by the expression:

$$\frac{I_r}{I_a} = \frac{f(r, \mu)}{f(r_a, \mu)}$$

and means being provided for determining from the said ratio the rate of change of the distance $r$, thereby to indicate the rate of range closure between the first and second objects.

18. Apparatus for determining at least one of relative bearing and elevation angles between first and second objects, having, in combination, means for propagating energy between the objects, the first of the objects being provided with at least two energy detector sites spaced from each other a predetermined distance, means for moving the said detector sites as a unit to present different angles to the second object, means for measuring the ratio of the intensities of the energy detected at the respective detectors, means for indicating at least one of substantially maximum ratio, minimum ratio, and unity ratio to indicate the said angles, and means being provided responsive to the said ratio for determining the rate of change of said ratios, thereby to indicate the relative closure of at least one of the relative bearing and elevation angles between the first and second objects.

19. Apparatus as claimed in claim 3 and in which means is provided for determining from the said ratios the rate of change thereof, thereby to indicate the rate of closure of said distance $r$.

20. Apparatus as claimed in claim 19 and in which the determining means comprises means for differentiating the sum of the said ratios.

21. Apparatus as claimed in claim 6 and in which means is provided for determining from the said ratios and rate of change of at least one of the said relative bearing and elevation angles, thereby to indicate the rate of closure of said angles as the distance between the first and second objects changes.

22. Apparatus as claimed in claim 21 and in which the determining means comprises means for differentiating the difference of the said ratios.

23. Apparatus as claimed in claim 3 and in which computing means is provided wherein the said measured ratios are entered as coordinates therein, the distance $r$ being indicated by the coincidence of the coordinates with predetermined data corresponding to contours of successive values of the distance.

24. Apparatus as claimed in claim 23 and in which the computing means is further provided with predetermined data corresponding to successively increasing angle lines intersecting said contours, for indicating by coincidence with said coordinates, the angle between the objects in the plane formed by the said three detectors.

25. Apparatus as claimed in claim 3 and in which computing means is provided having means for determining the sum and difference of said measured ratios and entering the same into the computing means as coordinates, the distance $r$ being indicated by the coincidence of the coordinates with predetermined data corresponding to contours of successive values of the distance.

26. Apparatus as claimed in claim 25 and in which the computing means is further provided with predetermined data corresponding to successively increasing angle lines intersecting said contours, for indicating by coincidence with said coordinates, the angle between the objects in the plane formed by the said three detectors.

27. Apparatus as claimed in claim 3 and in which computing means is provided wherein the measured ratio is entered as one coordinate, the computing means having predetermined data corresponding to contours of successive values of the distance and means for indicating coincidence between said one coordinate and the data corresponding to the contours representing the said measured distance $r$ in order to determine the other coordinate, thereby indicating as such other coordinate the angle between the objects.

28. Apparatus as claimed in claim 3 and in which means is provided for measuring the difference between the intensities received at each of the two pairs of detectors and for taking the ratio of the differences to correct the distance-determining means for background energy.

References Cited

UNITED STATES PATENTS

| | | | |
|---|---|---|---|
| 2,206,036 | 7/1940 | Herson | 343—12 |
| 3,004,258 | 10/1961 | Cohen et al. | 343—112 |
| 3,134,104 | 5/1964 | Murphree et al. | 343—112 |

RODNEY D. BENNETT, *Primary Examiner.*

R. E. BERGER, *Assistant Examiner.*

U.S. Cl. X.R.

250—83.3, 43.5